United States Patent Office 3,016,897
Patented Jan. 16, 1962

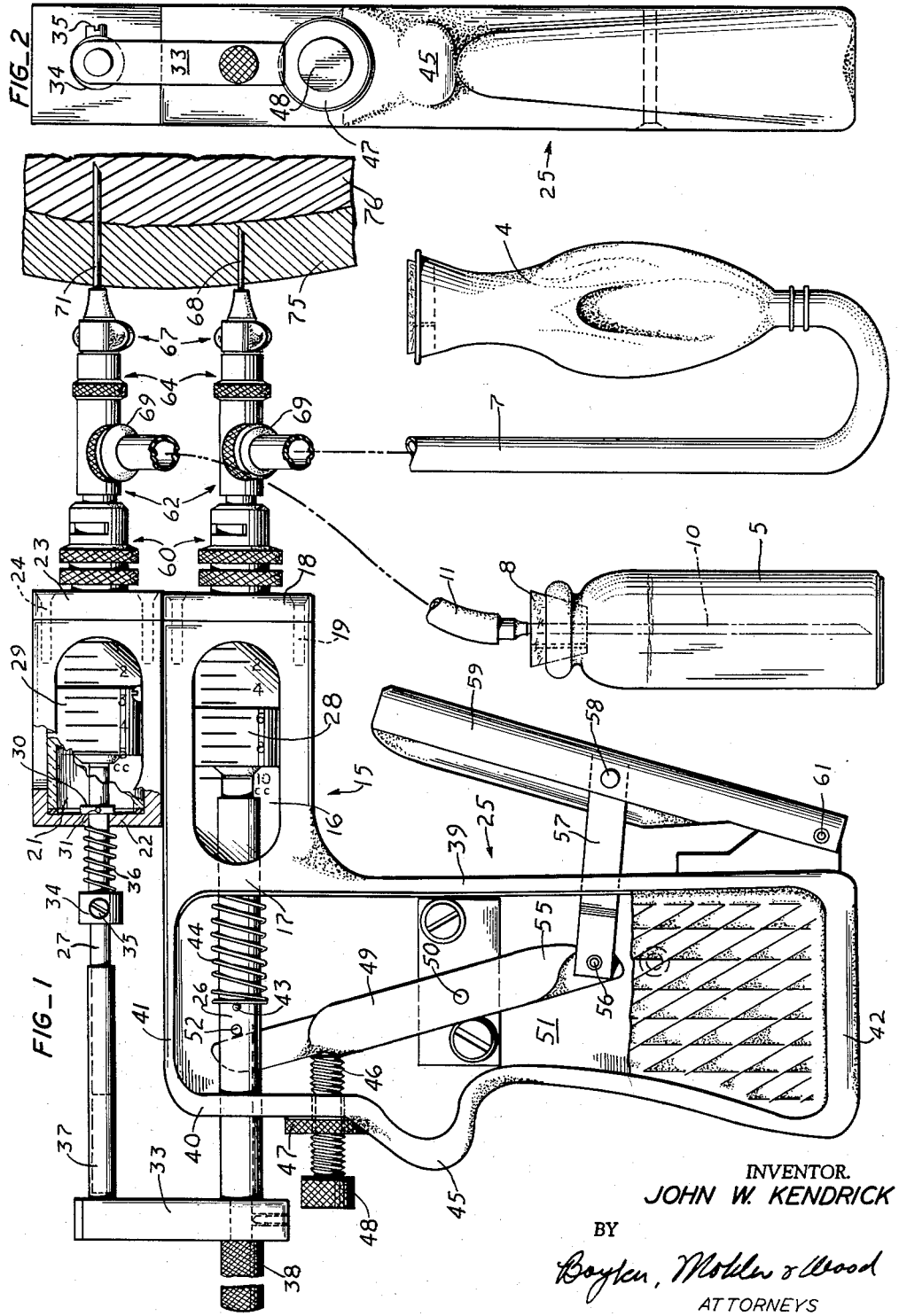

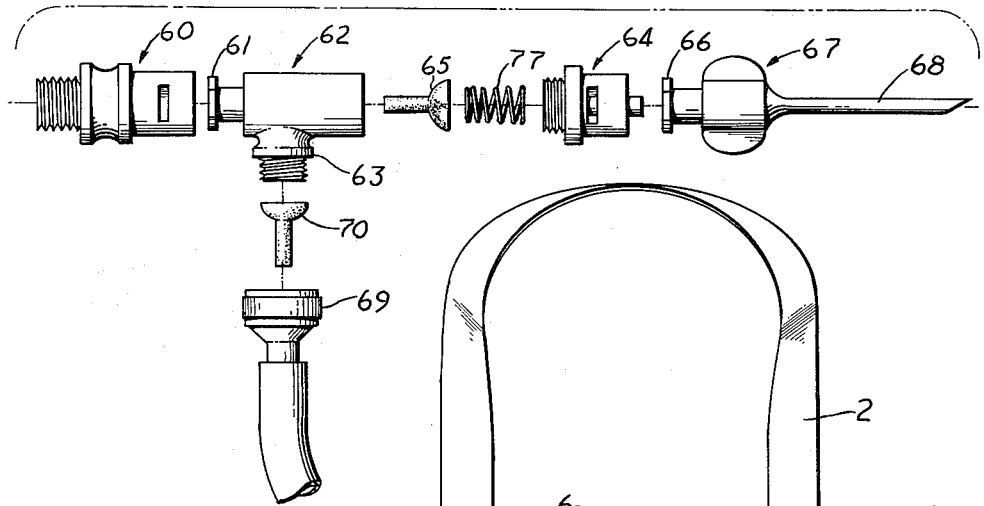

3,016,897
INJECTION MEANS FOR INJECTING SERUM, VACCINE, VIRUS AND THE LIKE INTO ANIMALS, AND METHOD
John W. Kendrick, 536 Anderson Road, Davis, Calif.
Filed Jan. 13, 1959, Ser. No. 786,475
3 Claims. (Cl. 128—218)

This invention relates to means for injecting serum, vaccine, virus and the like into animals and has for one of its objects the provision of a simple, rugged, easily manipulated injection apparatus for rapidly injecting a serum, vaccine, etc. into animals.

Another object of the invention is the provision of a device adapted to enable the substantially simultaneous injection of a serum and virus or vaccine into an animal, and which injection is quickly accomplished by actuation of a single member held in one hand of the operator.

Heretofore, it has been the practice to use a conventional thumb actuated syringe in injecting a serum, vaccine, etc. into an animal, which is not only a relatively slow process requiring refilling of the syringe barrel after each operation, but it is an extremely tiring operation since the hand is not operated in a manner in which the maximum strength is utilized.

Also, heretofore, in injecting a serum and virus into animals, such as for immunizing against hog cholera, two syringes have been employed for injecting the biologic products into opposite sides of each pig. This has been done in order to prevent mixing of the virus killing agent and the vaccine or virus, and were the injections made by separate instruments on the same side, the likelihood of such mixing would occur.

Furthermore, the injection of the living virus intramuscular and the serum below the skin is preferable for best results.

With the present invention the operator may make single or double injections, as desired, with far less fatigue, and more efficiently than heretofore. Also, means is provided for insuring against the mixing of double injections, and to insure subcutaneous and intramuscular injections at the same time.

Other objects and advantages will appear in the description and in the drawings.

In the drawings,

FIG. 1 is a side elevational view, partly in cross-section of the injection device including, in reduced size, a pair of containers adapted to hold the products to be injected.

FIG. 2 is a rear end view of the injection device of FIG. 1.

FIG. 3 is an exploded view of the valve structure that may be employed in the injection device of FIG. 1.

FIG. 4 is a side elevational view of one form of carrier adapted to be used in connection with the injection device for holding the containers for the products to be injected.

The present device is particularly adapted for use in the field where the animals to be treated may be found, and it is therefore portable. Any suitable carrier 1 (FIG. 4) may be provided, which carrier may have a shoulder strap 2 through which the arm of the operator may extend so that the carrier may be suspended from the shoulder. Body straps 3 secured to the lower end of the carrier are adapted to encircle the body of the wearer, so that the carrier will not become dislodged nor will the containers in the carrier be objectionably distributed during the activity of the wearer in handling animals in the injection step.

Containers 4, 5 are adapted to fit in the carrier 1 and any suitable cover or flap 6 may extend over the containers.

Two types of containers are indicated, but they may both be of the same type. Usually container 4, which is a bottle carrying the serum, is the larger of the two, while the container 5, which carries the vaccine or virus, is the smaller. This, normally, is because the injection of serum is larger than that of the vaccine or virus, where both are administered.

The container 4 is shown as having a flexible tube or conduit 7 leading from the bottom, and out of the carrier, while the bottle or container 5 may be the one in which the vaccine or virus is obtained, and provided with a closure 8 (FIG. 1) having an air vent therein, and through which closure a tube 10 extends to the bottom thereof. Flexible conduit 11 may extend from the upper end of the tube 10, and this conduit may extend from below flap 6 or through the bottom of the carrier 1, as may be found to be most desirable.

The injection device itself comprises a body, generally designated 15 (FIG. 1) which may be of any desired material, and which body has a horizontally elongated transparent barrel 16 therein. This barrel may be of glass, and has an inner end wall 17 and an outer end wall 18. The former is preferably part of the body 15 while the latter may be a plate that is removably secured over the outer end of the barrel 16 in sealing engagement therewith, by screws 19 or in any other suitable manner.

Body 15 further includes another barrel 21 disposed over and parallel with the barrel 16. This barrel 21 is of substantially the same structure as barrel 16, except shorter, being closed at one end by an end wall 22 while the opposite end is closed by plate 23 held in sealing engagement with the outer end of barrel 21 by screws 24 or by any other suitable means.

Integral with the portion of body 15 in which barrels 16 and 21 form upper and lower chambers, is a hollow pistol grip portion 25 that is adapted to be gripped by the hand of the user. This pistol grip portion projects laterally from the end of the barrel carrying portion of the body that is adjacent to the walls 17 and 22. Hence, this end of the body will be called the rear end, and the walls 17, 22 will therefore be at the rear ends of the barrels 16, 21, while plates 18, 23 are at the forward ends of the barrels. The words "rear," "rearwardly," "forward," "forwardly," and any other words having similar meanings, will be used to be consistent with the above arrangement.

Rear walls 17, 22 are each formed with an opening coaxial with the barrel 16, 21, and a piston or plunger rod 26 slidably extends through the opening in wall 17 while a similar piston or plunger rod 27 slidably extends through the opening in wall 22. A piston 28 is secured to the forward end of rod 26 within barrel 16, while a piston 29 is secured on the forward end of rod 27 within the upper barrel 21. These pistons make a liquid tight seal with the barrels and are reciprocable within the latter. The body 15 is formed with side openings through which the barrels are visible, and said barrels may be inscribed along their exposed sides with graduations indicating cubic centimeters or the like starting from their forward ends.

A collar 30 adjustably secured on rod 27 by a set screw 31 or by any other suitable means, is positioned within barrel 21 between the piston 29 and the end wall 22.

Outside the wall 22, rod 27 projects a substantial distance rearwardly of said wall and its rear end extends into a tube 37 that is connected at its rear end with the upper end of a bar 33 that depends therefrom.

A second collar 34 is adjustably secured by a set screw 35 on rod 27 in a position between wall 22 and tube 37, while an expansion helical spring 36 is disposed on rod 27 between collar 34 and wall 22.

The piston rod 26, outside the end wall 17, is connected with the lower end of bar 33 at the rear end of said rod, an elongated cap 38 being screwed on the rear end of rod 26 for releasably holding the lower end of bar 33 to rod 26.

The hollow cavity of the pistol grip portion 25 extends upwardly behind the rear wall 17 so that the said wall 17 virtually is an upward extension of the forward wall 39 of the pistol grip portion, and the rear wall 40 of said pistol grip portion is spaced rearwardly of the walls 17, 39.

The upper end of the rear wall 40 is formed with an opening through which the rod 26 slidably extends, and cap 38 is spaced rearwardly of and outside the rear wall 40. An upper wall 41 integral with body 15 closes the upper end of the cavity in the pistol grip handle or portion 25, while a lower end wall 42 closes the lower end of the handle.

The part of rod 26 that extends between the walls 17, 40 is provided with a pin 43 that may form a stop against which the rear end of a helical spring 44 reacts, said spring engaging the wall 17 at is forward end, and surrounding the rod 26. This spring 44 functions to retract the piston 28 and rod 26 as far as they are permitted to go. The spring 36 on rod 27 performs a similar function for the piston 29 and rod 27.

Threadedly extending through the wall 40 and above a hand engaging rearward extending portion 45 of said rear wall, is a screw 46 having a thumb lock nut 47 thereon outwardly of wall 40, and a finger engageable enlarged head 48 at its rear end.

Between pin 43 and the wall 40 the rod 26 is formed with a vertical slot into which extends the upper end of an arm 49, which arm is pivotally supported in the pistol grip cavity by a horizontal pivot 50 carried by the wall 51 that forms the bottom of the cavity. In the drawing this pivot is carried on a plate that, in turn, is screwed to wall 51, but the plate may be integral with the casting forming the handle 25.

A bearing pin 52 extending through the rod 26 at the forward end of the slot into which the upper end of the arm 49 extends engages the forward edge of the upper end of arm 49, and the forward end of screw 46 engages the rear edge of the upper end of arm 49.

Spring 44 yieldably holds the piston 28 and rod 26 retracted as far as screw 46 will permit, while the spring 36 on rod 27 will yieldably hold the piston 29 and rod 27 retracted as far as the collar 30 will permit. Upon rotating the screw 46 in one direction, the piston 28 will be moved toward forward wall or plate 18, thereby reducing the capacity of barrel 16 ahead of the piston, while by rotating the screw 46 in an opposite direction the piston 28 will be moved toward the rear wall 17 and the capacity of the barrel will be increased. In this manner, the amount of liquid adapted to be held in barrel 21 may remain the same, while the capacity of barrel 16 may be increased or decreased. This enables different ratios to be provided.

However, upon changing the position of collar 30 on rod 27 the capacity of the barrel 21 ahead of piston 29 may be reduced or increased, while the capacity of barrel 16 ahead of the piston 28 will remain the same.

The lower end portion 55 of arm 49 that extends below pivot 50 is pivotally connected by a horizontal pivot 56 with the rear end of a link 57 that projects forwardly thereof and through an opening in the forward wall 39 of the handle 25. The forward end of this link 57 is connected by a horizontal pivot 58 with a lever 59 that extends along the forward edge of the handle 25. The lower end of lever 59 is connected by a horizontal pivot 61 with the lower end of the pistol grip handle 25 at a point spaced below the pivot 58, while the upper end of this lever 57 extends above the pivot 58.

Spring 44 that is around rod 26 yieldably urges the pin 52 against the upper end of the arm 49 with the result that the lever 59 is yieldably held at its upper end spaced forwardly of the pistol grip portion or handle 25.

When the hand of an operator grasps the pistol grip handle 25, the forefinger of the hand, which has the maximum gripping strength is at the upper end of the lever 59. The fingers successively below the forefinger usually have progessively less gripping strength than the forefinger. Thus actuation of the lever 59 where the mechanical advantage is greatest will be by the forefinger and those nearest it, hence the lever 59 may be actuated many more times without tiring the fingers than were the lever 59 pivoted at its upper end with the lower end spaced outwardly of the pistol grip portion.

Carried by plate 18 is a tubular fitting 60 (FIGS. 1, 3) that may be threaded at one end into an opening formed in said plate. This fitting has an interrupted single thread therein (not shown) adapted to be engaged by the complementarily formed thread 61 (FIG. 3) on one end of a hollow T-body 62. This T-body is formed with a through passageway from the end that carries thread 61 to the opposite end, and the leg 63 of the T-body is formed with a branch passageway therethrough communicating with the through passageway through body 62.

A tubular relatively short, open-ended fitting 64 is adapted to be threadedly held at one end in the end of body 62 that is opposite to fitting 60, and this latter fitting 64 in conjunction with body 62 encloses a check valve 65 that is spring urged to closed position by a spring 77.

This fitting 64 is formed with an inside interrupted thread, similar to that of the fitting 60, for releasably engaging the single complementarily formed interrupted thread 66 on the base 67 of a hollow injection needle 68.

The leg 63 of body 62 is exteriorly threaded for engagement with the threads on one end of a tube coupling body 69 that is adapted to be connected wtih tube 7 (FIG. 1). Within the body 69 is a check valve 70.

Plate 23 carries a structure that is identical with that of plate 18, as above described, except that the needle, indicated at 71 (FIG. 1) normally longer than the needle 68, and therefore projects a greater distance outwardly of the base 67 than the needle 68. The tube 11 connected with the container 5 connects with the leg of the body 62 that carries the needle 71.

In operation, where say a serum and a vaccine or virus are to be injected into an animal, the pistol grip 25 is grasped by the hand of an operator, but the lever 59 is not actuated. The needles 68, 71 are then thrust into the hide 75 (FIG. 1) of the animal at the desired location until the base 67 of the needle holder engages the outer surface of the skin. When this occurs the outer end of the shorter needle is below the skin while needle 71 extends into the muscle 76.

The lever 59 is then retracted and the serum in barrel 16 ahead of the piston 28 is injected below the skin while the vaccine or virus in barrel 21 may be injected into the muscle 76.

The check valves 70 will automatically close during the injections, while valves 65 will open.

As soon as the lever 59 has reached the end of its stroke the needles may be withdrawn and the lever released, with the result that springs 36, 44 will retract the pistons 29, 28 and valve 70 will open while valve 65 will close. Serum will automatically be drawn into barrel 16, and the virus or vaccine into barrel 21 and the device will be ready for another operation.

In the event merely a serum or vaccine is to be administered, the needle 71 may be removed, together with the body 62, if desired, and the bar 33 and tube 37 may be removed. The lower barrel 16 will then be the only one used, and the stroke of the piston may be changed to vary the charge of the product to be injected.

The use of the term "biologic products" is intended to include serum, vaccine, virus, and any products that may be used for immunizing purposes or for treatment.

I claim:

1. An injection device for injecting a serum and a vaccine, virus and the like into an animal comprising; a body having a pistol grip portion therein adapted to be gripped by the fingers of one hand of a person, a pair of separate metering chambers within said body adapted for respectively holding a serum and a vaccine to be discharged therefrom, a pair of hollow, parallel, spaced injection needles in side by side relation projecting from a side of said body and carried thereon in communication with said chambers respectively, movable means movable within each of said chambers for substantially simultaneously ejecting the serum and vaccine therefrom and from said needles, a finger actuatable movable member alongside said pistol grip portion adapted for actuation for movement by the hand grasping said pistol grip portion, and means connecting said movable means with said movable member for simultaneously moving said movable means to effect the ejection of serum and vaccine from said chambers, and containers connected with said chambers for supplying the latter with a serum and a vaccine and the like.

2. An injection device for injecting a serum and a vaccine, virus and the like into an animal comprising; a body having a pistol grip portion therein adapted to be gripped by the fingers of one hand of a person, a pair of separate metering chambers within said body adapted for respectively holding a serum and a vaccine to be discharged therefrom, a pair of hollow, parallel, spaced injection needles in side by side relation projecting from a side of said body and carried thereon in communication with said chambers respectively, movable means movable within each of said chambers for substantially simultaneously ejecting the serum and vaccine therefrom and from said needles, a finger actuatable movable member alongside said pistol grip portion adapted for actuation for movement by the hand grasping said pistol grip portion, and means connecting said movable means with said movable member for simultaneously moving said movable means to effect the ejection of serum and vaccine from said chambers, and containers connected with said chambers for supplying the latter with a serum and a vaccine and the like, control means outside said body connected with said movable means for regulating the quantity of serum and vaccine adapted to be ejected from said chambers upon actuation of said movable member.

3. An injection device for injecting a serum and a vaccine, virus and the like into an animal comprising; a body having a pistol grip portion therein adapted to be gripped by the fingers of one hand of a person, a pair of separate metering chambers within said body adapted for respectively holding a serum and a vaccine to be discharged therefrom, a pair of hollow, parallel, spaced injection needles in side by side relation projecting from a side of said body and carried thereon in communication with said chambers respectively, movable means movable within each of said chambers for substantially simultaneously ejecting the serum and vaccine therefrom and from said needles, a finger actuatable movable member alongside said pistol grip portion adapted for actuation for movement by the hand grasping said pistol grip portion, and means connecting said movable means with said movable member for simultaneously moving said movable means to effect the ejection of serum and vaccine from said chambers, and containers connected with said chambers for supplying the latter with a serum and a vaccine and the like, one of said needles projecting a greater distance from said body than the other and stop means for limiting the degree of penetration of said needles into an animal whereby one of said needles will be adapted to effect an intramuscular injection at the same time the other is adapted to make a subcutaneous injection.

References Cited in the file of this patent

UNITED STATES PATENTS

| | | |
|---|---|---|
| 1,211,304 | Farr | Jan. 2, 1917 |
| 1,718,596 | Smith | June 25, 1929 |
| 2,643,653 | Heidrich | June 30, 1953 |
| 2,670,673 | Gordon et al. | Mar. 2, 1954 |
| 2,750,943 | Dann | June 19, 1956 |

FOREIGN PATENTS

| | | |
|---|---|---|
| 686,998 | Great Britain | Feb. 4, 1953 |
| 756,957 | Great Britain | Sept. 12, 1956 |